United States Patent
Dukatz

(10) Patent No.: US 10,277,473 B2
(45) Date of Patent: Apr. 30, 2019

(54) MODEL DEPLOYMENT BASED ON BENCHMARKED DEVICES

(71) Applicant: Accenture Global Solutions Limited, Dublin (IE)

(72) Inventor: Carl Matthew Dukatz, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 284 days.

(21) Appl. No.: 15/161,479

(22) Filed: May 23, 2016

(65) Prior Publication Data

US 2017/0339021 A1 Nov. 23, 2017

(51) Int. Cl.
*G06F 15/177* (2006.01)
*H04L 12/24* (2006.01)
*H04L 29/08* (2006.01)

(52) U.S. Cl.
CPC ............ *H04L 41/145* (2013.01); *H04L 41/16* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,065,342 B1* | 11/2011 | Borg | .................... | G06Q 10/06 455/456.1 |
| 8,185,423 B2* | 5/2012 | Brook | .................... | G06Q 10/06 370/230 |
| 8,495,170 B1* | 7/2013 | Vosshall | .................. | H04L 67/16 709/217 |
| 2006/0123080 A1* | 6/2006 | Baudino | .............. | H04L 67/306 709/204 |
| 2007/0088987 A1* | 4/2007 | Kimizuka | ............. | G06F 9/3802 714/42 |
| 2007/0174467 A1* | 7/2007 | Ballou, Jr. | ......... | H04L 63/0838 709/227 |
| 2011/0282631 A1* | 11/2011 | Poling | .................... | G06Q 10/10 702/188 |
| 2014/0157113 A1* | 6/2014 | Krishna | ............... | G06F 17/289 715/249 |

* cited by examiner

*Primary Examiner* — Mohamed Ibrahim

(74) *Attorney, Agent, or Firm* — Fish & Richardson P.C.

(57) ABSTRACT

Implementations include deploying portions of a model used in a cognitive computing process for execution on respective devices in a distributed system, and include processing a device list to provide a benchmark list that includes an inventory of devices across systems that provide data for execution of the model used in the cognitive computing process, each device being a candidate for executing at least a portion of the model, the benchmark list including the devices, and, for each device, accuracies of the device with respect to the at least a portion of the model, providing a deployment plan based on the device and benchmark lists, the deployment plan specifying tasks to be executed by each device, at least two devices included in respective systems, at least one device providing data that is to be processed based on the at least a portion of the model, and executing the deployment plan.

20 Claims, 3 Drawing Sheets

MODEL DEPLOYMENT BASED ON BENCHMARKED DEVICES

BACKGROUND

Machine learning refers to techniques for using computing systems to train predictive models that use past training examples to predict the outcome of future events that are similarly situated as the training examples. For example, machine learning can be used to train a predictive model, or for brevity, model, that predicts the market value of a house given particular attributes of the house (e.g., square footage, ZIP code, etc.). The attributes are referred to as features of the model. A collection of features associated with a single data point used to train the model is referred to as a training example.

In some examples, data that is generated by one or more devices is processed through one or more models in a cognitive computing environment. For example, a device can generate data (e.g., an image, a video, audio), which is processed by one or more features of the model to provide an output. Frequently, data (e.g., images, video, audio) are captured from mobile devices and/or remote devices. Information brought back from the devices is typically limited to the content of the sensor collection itself, as well as metadata associated with the data. In some examples, the information is received at a back-end system, which process the data based on one or more models to provide one or more results.

SUMMARY

Implementations of the present disclosure are generally directed to deploying computer-executable models, and/or portions of models to two or more devices based on benchmarking of devices. In some implementations, actions include processing a device list to provide a benchmark list, the device list including an inventory of a plurality of devices across one or more systems that provide data for execution of the model used in the cognitive computing process, each device in the device list being a candidate for executing at least a portion of the model, the benchmark list including the plurality of devices, and, for each device, one or more accuracies of the device with respect to the at least a portion of the model, providing a deployment plan based on the device list and the benchmark list, the deployment plan specifying one or more tasks to be executed by each of a plurality of devices, at least two devices being included in respective systems, at least one device providing data that is to be processed based on the at least a portion of the model, and executing the deployment plan. Other implementations of this aspect include corresponding systems, apparatus, and computer programs, configured to perform the actions of the methods, encoded on computer storage devices.

These and other implementations can each optionally include one or more of the following features: processing the device list to provide a benchmark list includes determining a data sample rate for the at least a portion of the model, the data sample rate being used to achieve a threshold accuracy of output from the at least a portion of the model; processing the device list to provide a benchmark list includes determining an accuracy of one or more devices in the plurality of devices with respect to the at least a portion of the model; providing the deployment plan is at least partially based on technical costs associated with execution of the at least a portion of the model on respective devices; executing the deployment plan includes: providing computer-executable instructions, each computer-executable instruction being specific to a device of the plurality of devices, and being executable by the device to perform the one or more tasks assigned to the device, and transmitting the computer-executable instructions over a network for installation on and execution by respective devices of the plurality of devices; at least one device in the plurality of devices executes a portion of the model without providing data for processing by the model; and the systems include a vehicle and a building.

Implementations of the present disclosure provide one or more of the following advantages. In some examples, implementations of the present disclosure enable an automated system to determine the optimal method for implementation of analytic algorithms in a diverse distributed environment. The system is sensitive to change and resilient and adaptive to failures. This can be important for remote devices, for example, when a component within a device fails to function, and another processor in the device can continue working within some capacity provide the work it was doing is properly mapped to the new configuration.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
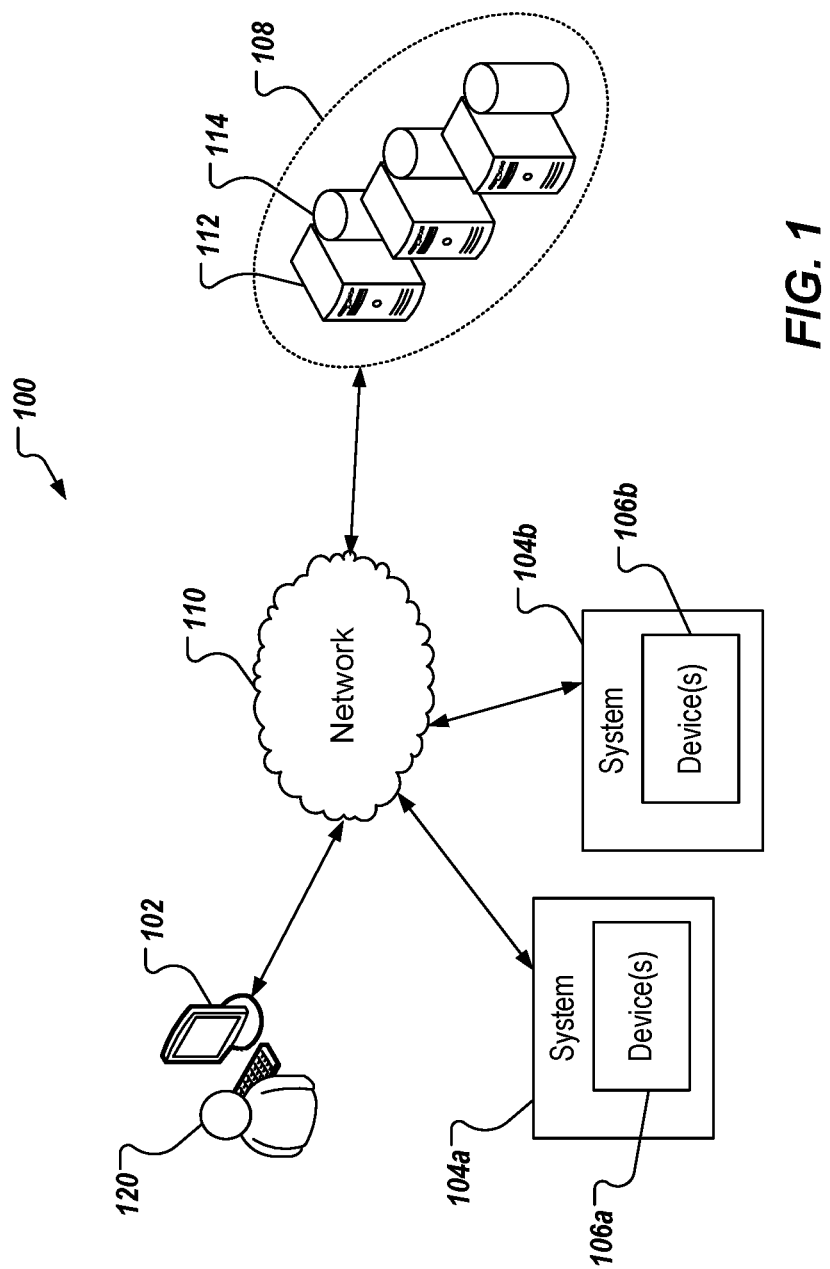
FIG. 1 depicts an example system that can execute implementations of the present disclosure.

Implementations of the present disclosure are generally directed to deploying computer-executable models, and/or portions of models to devices for distributed computing and analytics. More particularly, implementations of the present disclosure are directed to deploying computer-executable models, and/or portions of models to two or more devices based on benchmarking of devices. In some examples, the benchmarking is used by device management systems to deploy models, and/or portions of models to appropriate devices for distributed computing and analytics. In some examples, a deployment plan is provided, and models, or portions of models, are deployed based on the deployment plan. In some examples, benchmarking and the deployment plan are provided based on a library of devices, capabilities of respective devices, and optimal compute settings for analytics on respective devices. In some examples, attributes, such as optimal sampling rates, and how often sensors themselves are required in an environment to gain accuracy, are included. In some implementations, an evolution of capabilities of a device can be tracked over time. In this manner, a deployment plan can be provided, and/or can be modified based on changed capabilities of a device.

Implementations of the present disclosure can be included in an example context. The example context includes content review optimization within a cognitive computing environment, as described in further detail herein. It is contemplated, however, that implementations of the present disclosure can be realized in any appropriate context, and are not limited to the example context described herein.

As noted above, the example context includes content review optimization within a cognitive computing environment. In some examples, a content review process can include reviewing and acting on one or more entities. Example entities can include insurance claims, social media postings, warranty claims, and trouble tickets (e.g., in an information technology (IT) environment). An example content review process can include classification of entities using a machine-learning component, human review of a sub-set of classified entities provided from the machine-learning component, and action and/or feedback to the cognitive computing environment. In some examples, the machine-learning component processes one or more models to process input (e.g., information related to an entity), and provide output (e.g., one or more classifications related to the entity). In some examples, a model includes one or more features that are evaluated to provide an output. For example, a model can be provided to predict the market value of an asset (e.g., a house) given particular attributes of the house (e.g., square footage, ZIP code, location, etc.), where attributes of the asset are referred to as features of the model.

In accordance with implementations of the present disclosure, distribution of one or more portions of a model used in a cognitive computing process across a plurality of devices, and execution of respective portions of the model by respective devices provides one or more technical advantages. For example, a more efficient use of resources (e.g., processors, memory, communication bandwidth) is provided by leveraging capabilities of the distributed devices in the cognitive computing process. In this manner, for example, resources of a back-end system are conserved, as the back-end system is not wholly burdened with processing the model. As another example, a leaner (less resource intensive) back-end system can be implemented, because of the reduced number of back-end resources needed to process the model. In some examples, accuracy of the model output can be enhanced, because devices that may provide more accurate outputs are tasked with processing at least a portion of the model.

FIG. 1 depicts an example system 100 that can execute implementations of the present disclosure. The example system 100 includes a computing device 102, systems 104a, 104b, each of which includes one or more devices 106a, 106b, respectively, a back-end system 108, and a network 110.

In some examples, the network 110 includes a local area network (LAN), wide area network (WAN), the Internet, or a combination thereof, and connects web sites, devices (e.g., the computing device 102, the devices 106a, 106b), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database). In some examples, the at least one server system 112 hosts one or more computer-implemented services that users can interact with using computing devices. For example, the server system 112 can host a computer-implemented service for a content review process, which can include reviewing and acting on one or more entities. An example content review process can include classification of entities using a machine-learning component/cognitive computing component executed by the back-end system 108.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is provided as a desktop computer that is used by a user 120. In some examples, the user 120 can include a human reviewer in an example content review process that includes classification of entities using a machine-learning component (e.g., at least partially executed by the back-end system 108), human review of a sub-set of classified entities provided from the machine-learning component (e.g., executed by the user 120 using the computing device 102), and action and/or feedback to the cognitive computing environment.

In some implementations, the systems 104a, 104b can include any appropriate systems that can include the one or more devices 106a, 106b. Example systems can include vehicles (e.g., car, boat, train, plane), buildings (e.g., residential, commercial), and the like. In some implementations, each device 106a, 106b can provide data packages including digital content that is used in the example content review process. Example 106a, 106b devices can include cameras (e.g., still, video, etc.), microphones, accelerometers, environmental sensors (e.g., temperature, pressure, moisture, wind, seismic activity, etc.), alarms (e.g., smoke, carbon monoxide, burglar, etc.), and other types of sensors (e.g., vehicle telemetry sensors). In some examples, the devices 106a, 106b can include fixed-position devices (e.g., street cameras, weather sensors, smoke/carbon monoxide alarms, burglar alarms, etc.). In some examples, the devices 106a, 106b can include mobile devices (e.g., drone-mounted devices, vehicle mounted devices, weather balloons, etc.).

In some implementations, each device 106a, 106b includes one or more components. Example components can include sensors, processing hardware (e.g., processing unit(s)), computer-readable/-writable memory, a power source (e.g., battery), and communication hardware (e.g., wired/wireless communication). For example, an example device can include a camera unit that is used to monitor a system (e.g., residential/commercial security camera), and can include camera (sensor), a processor, memory, a power source, and communication hardware that enables the camera unit to communicate with a network (e.g., the Internet, LAN, WAN). In some examples, the camera unit can generate digital content (e.g., images, video) that is stored in memory, and that can be sent to the network. In some examples, the camera unit can process the digital content using the processor based on software executed by the camera unit (e.g., image enhancement). As another example, an example device can include a weather unit that is used to collect weather data in an environment around a system (e.g., residential/commercial building), and can include a temperature sensor, a pressure sensor, a wind speed sensor, a processor, a power source, and communication hardware that enables the weather unit to communicate with a network (e.g., the Internet, LAN, WAN). In some examples, the weather unit can generate digital content (e.g., temperature, pressure, wind speed data points) that is stored in memory, and that can be sent to the network. In some examples, the processor has limited functionality, and cannot meaningfully process the digital content. For example, the processor can be an application-specific integrated circuit (ASIC) that is programmed to simply log data points in a log file, and periodically transmit data over the network.

As introduced above, implementations of the present disclosure are generally directed to deploying computer-executable models, and/or portions of models to devices for distributed computing and analytics. More particularly, implementations of the present disclosure are directed to developing and executing a deployment plan to distribute one or more portions of a model to one or more devices across one or more systems for execution as part of a content review process within a cognitive computing environment. In some implementations, and as described in further detail herein, components of devices, and capabilities of the components are provided. In some implementations, the components/capabilities are used to provide an accuracy benchmark for respective devices. In some examples, the accuracy benchmark indicates an accuracy of a respective device with respect to processing that could be performed using the particular device.

In some implementations, a deployment plan is provided based on the devices available for processing one or more portions of the model, and respective accuracy benchmarks for components of the devices. In some examples, the deployment plan defines which portions of a model are to be executed on which devices. In some examples, the deployment plan indicates one or more additional functionalities that are to be performed, by which devices. Example additional functionalities can include receiving data (e.g., from a back-end system, from one or more other devices) for processing a portion of the model, receiving output from a portion of the model for processing through another portion of the model (e.g., from a back-end system, from one or more other devices), transmitting an output of a portion of the model (e.g., to a back-end system, to one or more other devices). In some examples, a device executes a portion of the model based on digital content (data) provided by the device, and/or provided by one or more other devices. In some implementations, output of each of the devices are provided to a back-end system, which processes the outputs to provide one or more results of the cognitive computing process.

Implementations of the present disclosure will be described in further detail herein with reference to an example use case. The example use case includes an enterprise using cognitive computing to monitor a fleet of vehicles (e.g., cars, trucks). In this example, a vehicle can be provided as a system (e.g., systems 104a, 104b of FIG. 1), and can include one or more devices (e.g., devices 106a, 106b of FIG. 1). In this example, example devices can include a vehicle telematics device that receives input from one or more sensors distributed within the vehicle and provides vehicle telematics data, and an environment device that samples and records environmental characteristics (e.g., pressure, temperature, wind speed) of an environment around the vehicle. In some examples, the enterprise uses cognitive computing to monitor the fleet of vehicles for maintenance purposes (e.g., predictive maintenance), and/or for insurance purposes (e.g., tracking vehicle use/weather to determine insurance premiums). In some implementations, example systems can include systems of the enterprise that are not directly related to the fleet of vehicles. For example, an example system can include a climate control system including environmental monitoring/control devices (e.g., temperature sensors, thermostats) located at one or more facilities (e.g., factory, distribution center, headquarters) of the enterprise. In some examples, data from the climate control system is not directly used to monitor the fleet of vehicles.

Figure 2:
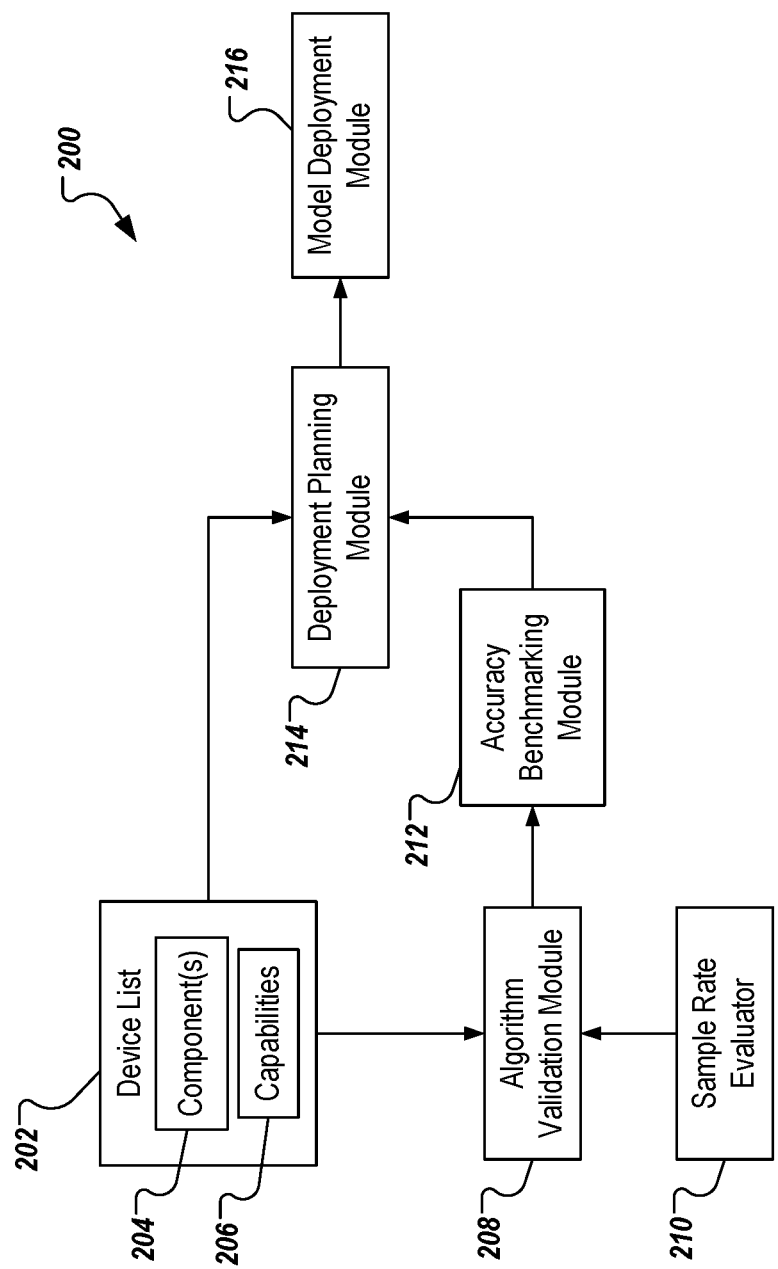
FIG. 2 depicts an example module architecture in accordance with implementations of the present disclosure.

FIG. 2 depicts an example architecture 200 in accordance with implementations of the present disclosure. In some implementations, the example architecture 200 provides and executes deployment plans, as described herein. In the depicted example, the example architecture 200 includes a device list 202, which includes a components list 204, and a capabilities list 206, an algorithm validation module 208, a sample rate evaluator 210, an accuracy benchmarking module 212, a deployment planning module 214, and a model deployment module 216.

In some implementations, the device list 202 is provided as a computer-readable file (e.g., stored in computer-readable/-writable memory), and includes an inventory of devices across one or more systems. In some examples, each device is associated with a unique identifier and/or a unique address (e.g., Internet Protocol (IP) address). In some examples, the address is unique to the device itself. In some examples, the address is unique to the system, in which the device is included. In the depicted example, the device list 202 is provided to the algorithm validation module 208, and the deployment planning module 214.

In some implementations, the inventory includes devices that are directly related to a goal of the cognitive computing environment. With reference to the example use case above, the inventory can include the vehicle telematics device, and the environment device of each vehicle, which devices provide data that is used to monitor the fleet of vehicles using cognitive computing. In some examples, the inventory includes devices that are not directly related to a goal of the cognitive computing environment. With reference to the example use case above, the inventory can include the monitoring/control devices of the climate control system, which devices provide data that is not used to monitor the fleet of vehicles using cognitive computing. In some implementations, the components list 204 includes an inventory of components included in each device. For example, and as noted above, example components can include sensors, processing hardware (e.g., processing unit(s)), computer-readable/-writable memory, a power source (e.g., battery), and communication hardware (e.g., wired/wireless communication).

In some implementations, the capabilities list 206 provides detail on one or more features of each component in the components list 204. Example features can include number of cores, size of cache (if any), frequency (e.g., GHz), power consumption (e.g., nominal, worst case), and the like (with respect to processors), type, size, speed, and the like (e.g., read, write) (with respect to memory), and wired, wireless, WiFi, Bluetooth, Bluetooth Low Energy, near-field communication, and the like (with respect to communication channels).

In some implementations, the sample rate evaluator 210 determines a data sample rate for data that is to be processed using the model to achieve a desired accuracy. For example, a threshold accuracy level can be provided for the model as a whole, and/or threshold accuracy levels can be provided for portions of the model that are to be distributed across systems (devices). In some examples, a threshold accuracy level can be provided as a value (e.g., percentage), or range of values (e.g., range of percentages) that indicate an acceptable deviation from an actual value. An example threshold accuracy level can be provided as +/−1%. In some implementations, the sample rate evaluator 210 determines a data sample rate that is required to achieve a respective threshold accuracy level.

In some implementations, the sample rate evaluator 210 determines a data sample rate based on known test data, by executing the model (or portion of the model) using respective data sample rates, and comparing the results to the threshold accuracy. The data sample rate that achieves the threshold accuracy can be selected as the data sample rate for the model (or portion of the model). For example, the model (or portion of the model) can be executed using a first data sample rate of the test data to provide a first result, and the model (or portion of the model) can be executed using a second data sample rate of the test data to provide a second result. The first result and the second result can each be compared to an actual value (e.g., known based on the test data), and respective first and second deviations from the actual value can be provided. The respective first and second deviations can each be compared to the threshold accuracy to determine which of the first data sample rate or the second data sample rate is to be selected as the data sample rate for the model (or portion of the model). For example, if the first deviation exceeds the threshold accuracy (e.g., lies outside of +/−1%), and the second deviation does not exceed the threshold (e.g., lies on or within +/−1%), the second data sample rate is selected as the data sample rate for the model (or portion of the model). In some examples, the data sample rate can be selected as the minimum data sample rate to achieve the threshold accuracy level. Continuing with the above example, if the first deviation is within the threshold accuracy (e.g., is +/−0.9%), and the second deviation is also within the threshold accuracy, but to a better extent (e.g., is +/−0.5%), the second data sample rate is selected as the data sample rate for the model (or portion of the model). As another example, if the first deviation is within the threshold accuracy (e.g., is +/−0.9%), and the second deviation is also within the threshold accuracy, but to a better extent (e.g., is +/−0.5%), the first data sample rate is selected as the data sample rate for the model (or portion of the model) (e.g., a lower data sample rate can be used, while still achieving an acceptable accuracy).

In some implementations, the algorithm validation module 208 receives the device list 202 (e.g., retrieves the device list 202 from computer-readable memory), and receives the data sample rate(s) from the sample rate evaluator 210. In some examples, the algorithm validation module 208 maps the sample data to the appropriate device capabilities (e.g., CPU, GPU, ASIC, etc.) This validates that the algorithm can be executed by the device and creates the benchmarking test plan for the benchmarking stage.

In some implementations, the accuracy benchmarking module 212 receives the output from the algorithm validation module 208, and processes the output to provide benchmark values for respective devices. For example, for each device that is to be considered, the accuracy benchmarking module 212 determines an accuracy of a particular device with respect to the model (or portion of the model) the particular device could be tasked with. In some implementations, the accuracy benchmarking module 212 provides a benchmark list including one or more devices, and, for each device, one or more accuracies of the device with respect to a model, and/or portions of the model.

In some examples, the accuracy is determined by providing test data and computer-executable instructions (e.g., for executing the model (or portion of the model)) to a test device, the test device being the same make/model of the device that is provided in the respective system, obtaining results from the test device, and determining the accuracy of the device based on the results and known results. In some examples, the accuracy is determined by providing test data and computer-executable instructions (e.g., for executing the model (or portion of the model)) to a device that could be used to process the model (or portion of the model), obtaining results from the device, and determining the accuracy of the device based on the results and known results. In some examples, the accuracy is determined by processing test data using computer-executable program that is provided as a virtual device corresponding to the make/model of the device that is provided in the respective system, obtaining results from the virtual device, and determining the accuracy of the device based on the results and known results.

In some implementations, the deployment planning module 214 receives the list of devices 202 (e.g., from computer-readable/-writable memory), and the benchmark list from the accuracy benchmarking module 212. In some implementations, the deployment planning module 214 provides a deployment plan for deploying at least a portion of the model to at least one system, and at least one device within the at least one system. In some examples, the deployment plan is provided based on capabilities, benchmark values, and/or technical costs associated with the devices. In some examples, technical costs can include technical costs (e.g., processors, memory, bandwidth required to process the model (or portion of the model)).

In one example, it can be determined that a first device and a second device are both sufficiently accurate to process a particular portion of a model, but that the first device provides a larger amount of the data to be processed in the portion of the model than the second device. In view of this, it can be determined that transmitting data from the second device to the first device would consume a lower amount of bandwidth than transmitting data from the first device to the second device. Consequently, the first device can be assigned the task of executing the portion of the model as part of the deployment plan, thereby reducing bandwidth usage.

In another example, the first device provides a larger amount of the data to be processed in the portion of the model than the second device, but the second device has larger memory than the first device. It can also be determined that, although transmitting data from the second device to the first device would consume a lower amount of bandwidth than transmitting data from the first device to the second device, the memory on the first device is insufficient to store data received from the second device, and/or execute the portion of the model. Consequently, the second device can be assigned the task of executing the portion of the model as part of the deployment plan.

In some implementations, the deployment plan includes a list of devices (and associated unique identifiers), and one or more tasks each device is to perform. Example tasks can include receive data, process model (or portion of model), transmit data, and the like. Continuing with the example above, an example deployment plan can include the first device, which is associated with the example tasks: receive data from the second device, process the portion of the model using data from the first device and data received from the second device to provide one or more results, and transmit the results to a specified (e.g., based on unique address) back-end system; and can include the second device, which is associated with the example task: transmit data to the first device (e.g., based on unique address). In some examples, the second device can transmit the data to the back-end system, which forwards the data to the first device.

It is contemplated that the deployment can include other and/or additional information than that discussed above.

In some implementations, the model deployment module 216 executes the deployment plan. In some examples, execution of the deployment plan can include providing computer-executable instructions for each device having a task assigned thereto, and transmitting the computer-executable instructions to respective devices. In some examples, the model deployment module 216 can retrieve template computer-executable instructions from a repository of computer-executable instructions, and can modify the template computer-executable instructions for a particular device and particular task(s). For example, a template computer-executable instruction can include instructions for executing a particular portion of a model, and can include variables (placeholders) to identify the device that is to execute the portion of the model, to identify the device(s) from which data is to be provided to execute the portion of the model, and/or to identify the device (or back-end system) to which results are to be transmitted, among other features. In some implementations, the model deployment module 216 transmits the computer-executable instructions to respective devices for installation and execution thereon.

Figure 3:
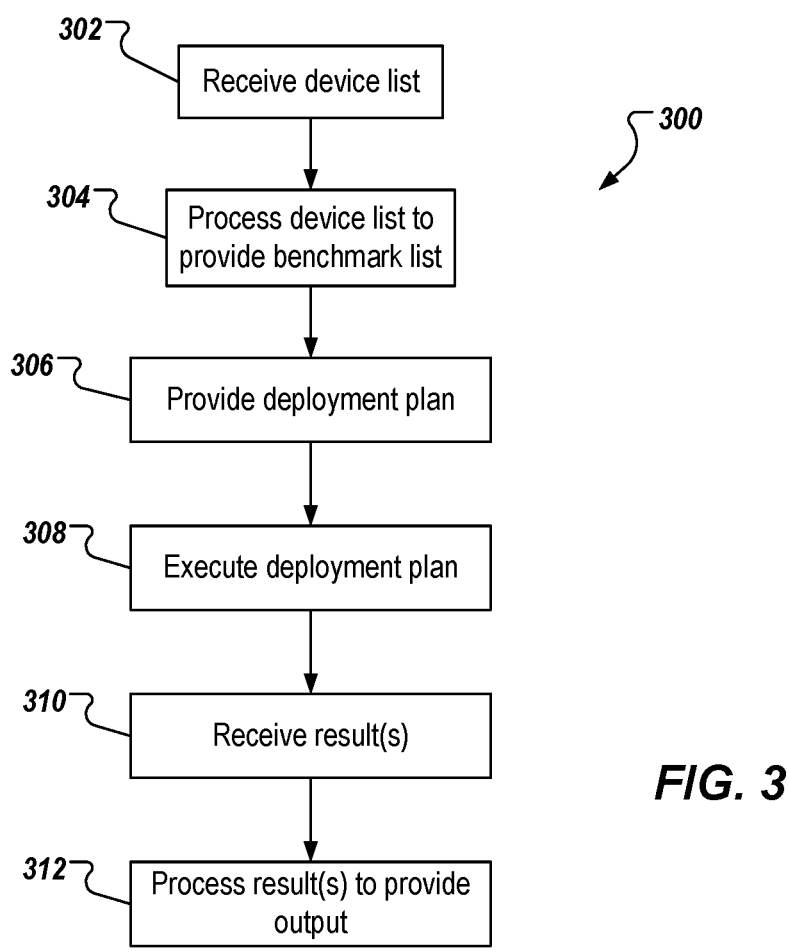
FIG. 3 depicts an example process that can be executed in implementations of the present disclosure.

FIG. 3 depicts an example process 300 that can be executed in implementations of the present disclosure. In some examples, the example process 300 is provided using one or more computer-executable programs executed by one or more computing devices (e.g., the back-end system 108 of FIG. 1).

A device list is received (302). For example, a device list can be retrieved from computer-readable memory. In some examples, the device list includes an inventory of a plurality of devices across one or more systems that provide data for execution of a model used in a cognitive computing process. In some examples, each device in the device list is a candidate for executing at least a portion of the model. The device list is processed to provide a benchmark list (304). In some examples, the benchmark list includes the plurality of devices, and, for each device, one or more accuracies of the device with respect to the at least a portion of the model. In some examples, the accuracy is determined by providing test data and computer-executable instructions (e.g., for executing the model (or portion of the model)) to a test device, the test device being the same make/model of the device that is provided in the respective system, obtaining results from the test device, and determining the accuracy of the device based on the results and known results. In some examples, the accuracy is determined by providing test data and computer-executable instructions (e.g., for executing the model (or portion of the model)) to a device that could be used to process the model (or portion of the model), obtaining results from the device, and determining the accuracy of the device based on the results and known results. In some examples, the accuracy is determined by processing test data using computer-executable program that is provided as a virtual device corresponding to the make/model of the device that is provided in the respective system, obtaining results from the virtual device, and determining the accuracy of the device based on the results and known results.

A deployment plan is provided (306). In some examples, the deployment plan is provided based on the device list and the benchmark list. In some examples, the deployment plan specifies one or more tasks to be executed by each of a plurality of devices, at least two devices being included in respective systems, at least one device providing data that is to be processed based on the at least a portion of the model. In some examples, the deployment plan is provided based on capabilities, benchmark values, and/or technical costs associated with the devices. In some examples, technical costs can include technical costs (e.g., processors, memory, bandwidth required to process the model (or portion of the model). The deployment plan is executed (308). In some examples, execution of the deployment plan includes providing computer-executable instructions for each device having a task assigned thereto, and transmitting the computer-executable instructions to respective devices.

Results are received (310). In some examples, results are received at a back-end system from one or more devices, to which at least a portion of the model was distributed for processing. In some examples, each result is a result provided by a respective device executing a respective portion of the model. The results are processed to provide output (312). For example, the back-end system processes the results in a remainder of the model to provide an output for the model as a whole. In some examples, the output is directed to the content review process.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for deploying portions of a model used in a cognitive computing process for execution on respective devices in a distributed system, the method being executed by one or more processors and comprising:

processing, by the one or more processors, a device list to provide a benchmark list, the device list comprising an inventory of a plurality of devices across one or more systems that provide data for execution of the model used in the cognitive computing process, each device in the device list being a candidate for executing at least a portion of the model, the benchmark list comprising the plurality of devices, and, for each device, one or more accuracies of the device with respect to the at least a portion of the model;

providing, by the one or more processors, a deployment plan based on the device list and the benchmark list, the deployment plan specifying one or more tasks to be executed by each of a plurality of devices, at least a first device, and a second device being included in respective systems, the first device being included in a first system, and the second device being included in a second system, different from the first system, the second device providing data from the second system that is to be processed based on the at least a portion of the model processed by the first device within the first system; and executing, by the one or more processors, the deployment plan, which comprises receiving data from the second device, and transmitting the data to the first device for processing in the at least a portion of the model.

2. The method of claim 1, wherein processing the device list to provide a benchmark list comprises determining a data sample rate for the at least a portion of the model, the data sample rate being used to achieve a threshold accuracy of output from the at least a portion of the model.

3. The method of claim 1, wherein processing the device list to provide a benchmark list comprises determining an accuracy of one or more devices in the plurality of devices with respect to the at least a portion of the model.

4. The method of claim 1, wherein providing the deployment plan is at least partially based on technical costs associated with execution of the at least a portion of the model on respective devices.

5. The method of claim 1, wherein executing the deployment plan comprises:

providing computer-executable instructions, each computer-executable instruction being specific to a device of the plurality of devices, and being executable by the device to perform the one or more tasks assigned to the device; and transmitting the computer-executable instructions over a network for installation on and execution by respective devices of the plurality of devices.

6. The method of claim 1, wherein at least one device in the plurality of devices executes a portion of the model without providing data for processing by the model.

7. The method of claim 1, wherein the systems comprise a vehicle and a building.

8. A non-transitory computer-readable storage medium coupled to one or more processors and having instructions stored thereon which, when executed by the one or more processors, cause the one or more processors to perform operations for deploying portions of a model used in a cognitive computing process for execution on respective devices in a distributed system, the operations comprising:

processing, by the one or more processors, a device list to provide a benchmark list, the device list comprising an inventory of a plurality of devices across one or more systems that provide data for execution of the model used in the cognitive computing process, each device in the device list being a candidate for executing at least a portion of the model, the benchmark list comprising the plurality of devices, and, for each device, one or more accuracies of the device with respect to the at least a portion of the model;

providing, by the one or more processors, a deployment plan based on the device list and the benchmark list, the deployment plan specifying one or more tasks to be executed by each of a plurality of devices, at least a first device, and a second device being included in respective systems, the first device being included in a first system, and the second device being included in a second system, different from the first system, the second device providing data from the second system that is to be processed based on the at least a portion of the model processed by the first device within the first system; and executing, by the one or more processors, the deployment plan, which comprises receiving data from the second device, and transmitting the data to the first device for processing in the at least a portion of the model.

9. The computer-readable storage medium of claim 8, wherein processing the device list to provide a benchmark list comprises determining a data sample rate for the at least a portion of the model, the data sample rate being used to achieve a threshold accuracy of output from the at least a portion of the model.

10. The computer-readable storage medium of claim 8, wherein processing the device list to provide a benchmark list comprises determining an accuracy of one or more devices in the plurality of devices with respect to the at least a portion of the model.

11. The computer-readable storage medium of claim 8, wherein providing the deployment plan is at least partially based on technical costs associated with execution of the at least a portion of the model on respective devices.

12. The computer-readable storage medium of claim 8, wherein executing the deployment plan comprises:

providing computer-executable instructions, each computer-executable instruction being specific to a device of the plurality of devices, and being executable by the device to perform the one or more tasks assigned to the device; and transmitting the computer-executable instructions over a network for installation on and execution by respective devices of the plurality of devices.

13. The computer-readable storage medium of claim 8, wherein at least one device in the plurality of devices executes a portion of the model without providing data for processing by the model.

14. The computer-readable storage medium of claim 8, wherein the systems comprise a vehicle and a building.

15. A system, comprising:

one or more processors; and a computer-readable storage device coupled to the one or more processors and having instructions stored thereon which, when executed by the one or more processors, cause the one or more processors to perform operations for deploying portions of a model used in a cognitive computing process for execution on respective devices in a distributed system, the operations comprising:

processing, by the one or more processors, a device list to provide a benchmark list, the device list comprising an inventory of a plurality of devices across one or more systems that provide data for execution of the model used in the cognitive computing process, each device in the device list being a candidate for executing at least a portion of the model, the benchmark list comprising the plurality of devices, and, for each device, one or more accuracies of the device with respect to the at least a portion of the model;

providing, by the one or more processors, a deployment plan based on the device list and the benchmark list, the deployment plan specifying one or more tasks to be executed by each of a plurality of devices, at least two devices being included in respective systems, the first device being included in a first system, and the second device being included in a second system, different from the first system, the second device providing data from the second system that is to be processed based on the at least a portion of the model processed by the first device within the first system; and executing, by the one or more processors, the deployment plan, which comprises receiving data from the second device, and transmitting the data to the first device for processing in the at least a portion of the model.

16. The system of claim 15, wherein processing the device list to provide a benchmark list comprises determining a data sample rate for the at least a portion of the model, the data sample rate being used to achieve a threshold accuracy of output from the at least a portion of the model.

17. The system of claim 15, wherein processing the device list to provide a benchmark list comprises determining an accuracy of one or more devices in the plurality of devices with respect to the at least a portion of the model.

18. The system of claim 15, wherein providing the deployment plan is at least partially based on technical costs associated with execution of the at least a portion of the model on respective devices.

19. The system of claim 15, wherein executing the deployment plan comprises:

providing computer-executable instructions, each computer-executable instruction being specific to a device of the plurality of devices, and being executable by the device to perform the one or more tasks assigned to the device; and transmitting the computer-executable instructions over a network for installation on and execution by respective devices of the plurality of devices.

20. The system of claim 15, wherein at least one device in the plurality of devices executes a portion of the model without providing data for processing by the model.

* * * * *